United States Patent [19]
Miller et al.

[11] Patent Number: 5,257,670
[45] Date of Patent: Nov. 2, 1993

[54] TWO PUMP POWER STEERING SYSTEM

[75] Inventors: Laurence L. Miller; Bruce C. Noah, both of W. Lafayette, Ind.

[73] Assignee: TRW Inc., Lyndhurst, Ohio

[21] Appl. No.: 766,757

[22] Filed: Sep. 27, 1991

[51] Int. Cl.[5] .............................................. B62D 5/08
[52] U.S. Cl. ...................................... 180/133; 180/132
[58] Field of Search ........................ 180/133, 132, 141

[56]  References Cited
U.S. PATENT DOCUMENTS

| | | | |
|---|---|---|---|
| 3,747,725 | 7/1973 | Feustel et al. ........................ | 180/133 |
| 4,237,993 | 12/1980 | Jablonsky . | |
| 4,303,089 | 12/1981 | Gage et al. ....................... | 180/133 X |
| 4,553,389 | 11/1985 | Tischer et al. .................... | 180/133 X |
| 4,798,256 | 1/1989 | Fassbender . | |

Primary Examiner—Joseph D. Pape
Attorney, Agent, or Firm—Tarolli, Sundheim & Covell

[57]  ABSTRACT

An apparatus provides hydraulic fluid for power steering assistance for steering a vehicle. A valve controls flow of hydraulic fluid from a first, engine driven, pump and a second, wheel driven, pump. The valve includes a valve housing and a valve member. The valve member is movable relative to the valve housing in response to a pressure differential in the hydraulic fluid from the first pump. The valve member in one range of relative positions provides a first flow passage from the first pump toward a steering valve, provides a variable second flow passage from the first pump toward the steering valve, and blocks hydraulic fluid flow from the second pump toward the steering valve. The first and second flow passages are in fluid parallel. The valve member in a control position provide a third flow passage from the second pump to the steering valve.

16 Claims, 3 Drawing Sheets

TWO PUMP POWER STEERING SYSTEM

BACKGROUND OF THE INVENTION

The present invention relates to an apparatus for providing power steering assistance for steering a vehicle.

Many vehicles, such as trucks, are difficult or impossible to steer without some sort of power steering assistance. Often, power steering assistance is provided for a vehicle by pressurized hydraulic fluid from an engine driven pump. However, the engine driven pump does not provide pressurized hydraulic fluid when the engine is somehow disabled, or the pump malfunctions.

As a safety feature, it has been suggested that a second pump for supplying pressurized hydraulic fluid be used to provide auxiliary or backup power assistance. In one system, the second pump is driven by rotation of a ground engaging wheel. Operation of the second pump by the ground-engaging wheel ensures that pressurized hydraulic fluid is provided for power steering when the vehicle is moving, irrespective of the condition of the engine and/or the engine driven pump.

It is recognized that pressurized hydraulic fluid from the second pump should be supplied for steering assistance immediately following engine or engine driven pump disablement. It is also recognized that a means for controlling the selection of one of the two pumps for supplying the pressurized hydraulic fluid should be directly related to the operating condition of the engine or engine driven pump. It is further recognized that the means for controlling should not be unduly complicated to minimize the possibility of a malfunction. Moreover, it is recognized that the means for controlling should not be restrictive to the flow of pressurized hydraulic fluid from the engine driven pump when the engine driven pump is functioning.

SUMMARY OF THE INVENTION

The present invention provides an apparatus for providing hydraulic fluid for power steering assistance for a vehicle. The apparatus includes a first hydraulic pump driven by an engine of the vehicle. The apparatus includes a second hydraulic pump driven by rotation of a ground engaging wheel of the vehicle. The apparatus includes a steering valve for directing hydraulic fluid to a power steering actuator.

The apparatus also includes a control valve for controlling the flow of hydraulic fluid from the first and second pumps to the steering valve. The control valve includes a means for providing a first flow passage for directing hydraulic fluid from the first pump toward the steering valve. The control valve also includes a means for providing a second, variably open, passage for directing hydraulic fluid from the first pump toward the steering valve in response to hydraulic fluid flow from the first pump. The first and second passages are in fluid parallel. The control valve further includes a means for providing a third passage for directing hydraulic fluid from the second pump toward the steering valve in response to hydraulic fluid flow from the first pump decreasing below a predetermined minimum.

In a preferred embodiment, the valve of the apparatus includes a valve housing and a valve member. The valve member is movable relative to the valve housing in response to a pressure differential in the hydraulic fluid from the first pump acting across the valve member. The valve member, in one range of relative positions, has means defining the first flow passage and means defining the second flow passage. The valve member is movable relative to the valve housing from the one range of relative positions to a control position in response to the pressure differential decreasing to a predetermined magnitude. The valve member, in the control position, has means defining the third flow passage.

BRIEF DESCRIPTION OF THE DRAWINGS

The foregoing and other objects and features of the present invention will become more apparent to one skilled in the art upon reading the following description of the present invention with reference to the accompanying drawings, in which.

DESCRIPTION OF PREFERRED EMBODIMENT

Figure 1:
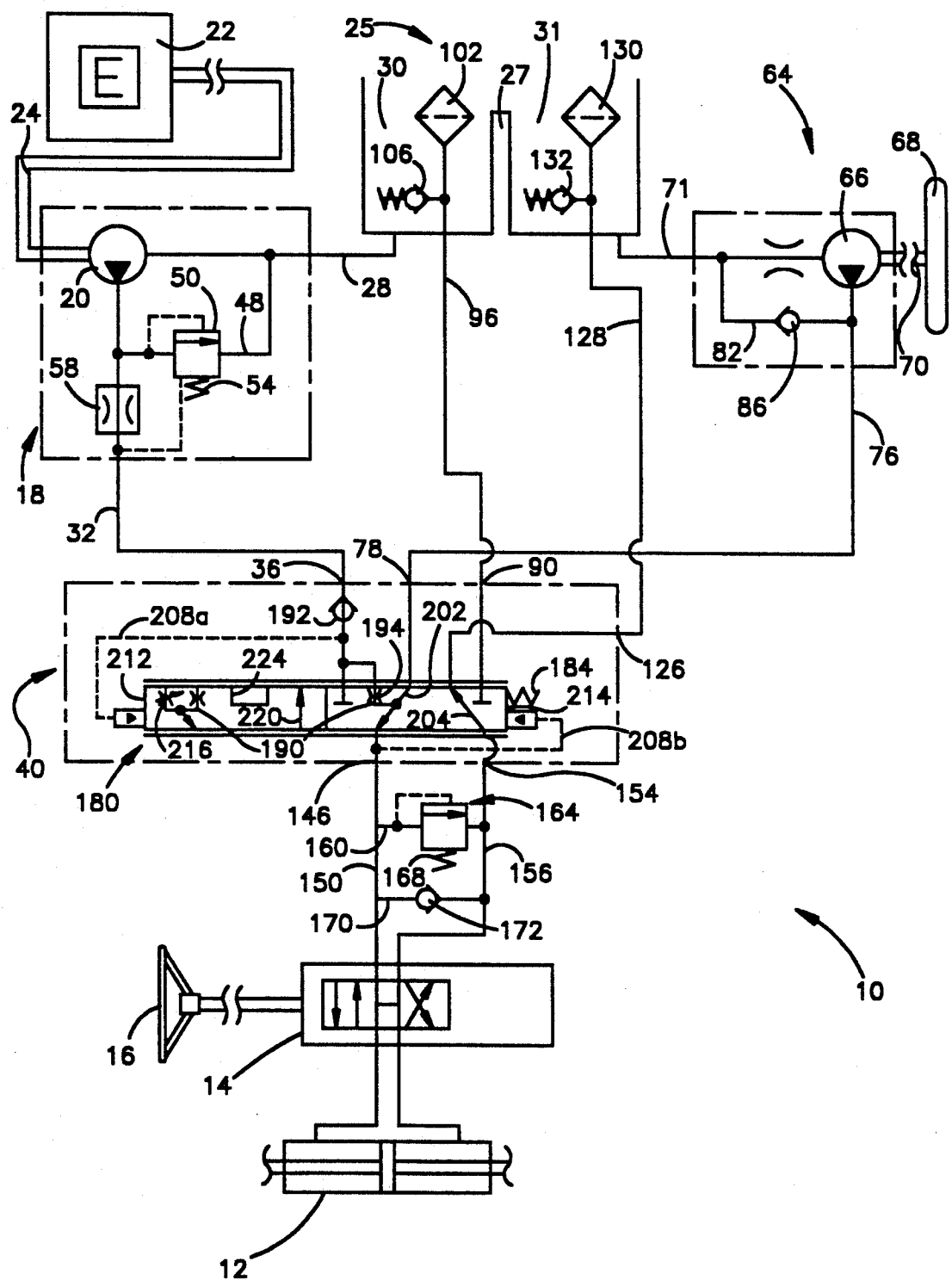
FIG. 1 is a schematic illustration of a power steering system embodying the present invention.

A vehicle power steering system 10 (FIG. 1) according to the present invention provides hydraulic fluid to a hydraulic power steering actuator 12. Hydraulic fluid is selectively provided to the actuator 12 from a steering valve 14 upon rotation of a steering wheel 16 by an operator of the vehicle, as is known in the art. The actuator 12 provides power assistance to turn a pair of steerable vehicle wheels (not shown), as is known in the art. In the preferred embodiment, the steering valve 14 and the steering actuator 12 form parts of a model TAS 85 heavy-duty integral power steering gear manufactured by the Ross Gear Division of TRW Inc., Lafayette, Ind.

The system 10 includes a first hydraulic pump mechanism 18 which includes a first hydraulic pump 20. In the preferred embodiment, the first hydraulic pump 20 is a balanced vane pump manufactured by Zahnradfabrik Friedrichshafen AG of Germany. The first pump 20 is driven by an engine 22 of the vehicle through a mechanical drive 24. The first pump 20 can be of any design and is only schematically illustrated. Also, the mechanical drive 24 can be of any design and is only schematically illustrated.

A reservoir 25 provides a supply of hydraulic fluid. The reservoir 25 is divided into two sections 30 and 31 by a barrier 27. The barrier 27 extends from the bottom of the reservoir 25 to a predetermined height within the reservoir 25. Hydraulic fluid at levels below the barrier 27 are prohibited from flowing between the two sections 30 and 31. Thus, the two sections 30 and 31 are isolated from each other. The first pump 20 draws hydraulic fluid from the first section 30 of the reservoir 25 through an intake line 28.

The first pump mechanism 18 provides pressurized hydraulic fluid through an output line 32. The output line 32 is connected to a first port 36 of a control valve 40. The first pump mechanism 18 includes a line 48 which connects the output line 32 and the intake line 28. In line 48 is a bypass valve 50. The bypass valve 50 is biased to a closed position by a biasing spring 54. A fixed orifice 58 in the output line 32 causes a pressure differential in the hydraulic fluid provided by the first pump 20.

As the flow through the output line 32 increases, the pressure differential across the fixed orifice 58 will increase. The bypass valve 50 opens as the pressure differential across the fixed orifice 58 increases. As the bypass valve 50 opens, a greater amount of hydraulic fluid is permitted to flow from the output line 32 through the line 48 to the intake line 28, and the flow of hydraulic fluid through the output line 32 to the first port 36 of the control valve 40 is maintained substantially constant.

The system 10 includes a second hydraulic pump mechanism 64 which includes a second hydraulic pump 66. In the preferred embodiment, the second hydraulic pump 66 is an eight piston pump manufactured by Zahnradfabrik Friedrichshafen AG of Germany. The second pump 66 is driven by a ground-engaging wheel 68 through a mechanical drive 70. The second pump 66 can be of any design and is only schematically illustrated. Also, the mechanical drive 70 can be of any design and is only schematically illustrated.

When the ground engaging wheel 68 rotates in one direction, the pump 66 draws hydraulic fluid through an intake line 71 from the second section 31 of the reservoir 25. The second pump 66 provides pressurized hydraulic fluid through an output line 76. The output line 76 is connected to a second port 78 of the control valve 40. The second pump device 64 includes a relief line 82 which connects the intake line 71 and the output line 76. A one-way valve 86 is positioned in relief line 82 and opens to prevent vacuum in the output line 76 upon reversal of the ground-engaging wheel 68.

The control valve 40 includes a third port 90. The third port 90 is connected to a return line 96. The return line 96 directs hydraulic fluid from the control valve 40 toward the first section 30 of the reservoir 25. The hydraulic fluid returning to the first section 30 of the reservoir 25 through the return line 96 passes through a filter 102 or, in the event of over-pressurization of the filter 102, through a relief valve 106.

The control valve 40 includes a fourth port 126. The fourth port 126 is connected to a return line 128. The return line 128 directs hydraulic fluid from the control valve 40 to the second section 31 of the reservoir 25. Hydraulic fluid flowing through the return line 128 to the second section 31 passes through a filter 130, or in the event of over-pressurization of the filter 130, through a relief valve 132.

The control valve 40 includes a fifth port 146. The fifth port 146 is connected to a supply line 150. The supply line 150 is connected to the steering valve 14. Pressurized hydraulic fluid flows from the control valve 40 through the supply line 150 to the steering valve 14. The steering valve 14 directs the pressurized hydraulic fluid to the actuator 12, as is known in the art.

The control valve 40 includes a sixth port 154. The sixth port 154 is connected to a return line 156. Hydraulic fluid returning from the actuator 12 through the steering valve 14 is returned to the control valve 40 through the return line 156.

A line 160 connects the supply line 150 and the return line 156. A relief valve 164 is disposed in the line 160. A biasing means 168 biases the relief valve 164 to a closed position. Over pressurization of the supply line 150 causes the relief valve 164 to open. The open relief valve 164 allows a flow of hydraulic fluid from the over pressurized supply line 150 to the return line 156.

A line 170 connects the supply line 150 and the return line 156. A one-way valve 172 is disposed in the line 170. The one-way valve 172 opens to permit flow of hydraulic fluid from the return line 156 to the supply line 150. The flow of hydraulic fluid through the one-way valve 172 occurs when the pressure in the return line 156 is greater than the pressure in the supply line 150.

The control valve 40 includes a valve member 180. The valve member 180 is biased to a control position, as shown in FIG. 2 and schematically illustrated by the right half of the valve member 180 in FIG. 1. The valve member 180 is biased to the control position by a biasing means 184, which is a coil spring. When the valve member 180 is in the control position, a flow passage 190 is established. The flow passage 190 provides a fluid connection between the first port 36 and the fifth port 146.

Thus, hydraulic fluid from the first pump 20 can flow toward the steering valve 14. This flow of hydraulic fluid passes through a one-way valve 192 and a fixed restriction 194 which is disposed along the flow path 190. The one-way valve 192 prevents hydraulic fluid flow along the flow path 190 from the valve member 180 toward the first pump 20. The fixed restriction 194 creates a pressure differential in the flow path 190.

When the valve member 180 is in the control position, a flow passage 202 is also established. The flow passage 202 provides a fluid connection between the second port 78 and the fifth port 146. Thus, hydraulic fluid from the second pump 66 can also flow toward the steering valve 14.

When the valve member 180 is in the control position, a return flow passage 204 is established. The flow passage 204 provides a fluid connection between the sixth port 154 and the fourth port 126. Thus, hydraulic fluid can flow from the steering valve 14 toward the second section 31 of the reservoir 25. When the valve member 180 is in its control position the third port 90 is blocked from fluid communication with any of the other ports of the control valve 40.

The control valve 40 includes flow passages 208a and 208b. The flow passages 208a and 208b provide fluid communication to first and second ends 212 and 214 of the valve member 180. The pressure of the hydraulic fluid applied to the first end 212 by passage 208a is substantially the pressure of the hydraulic fluid at the first port 36. The pressure of the hydraulic fluid applied to the second end 214 by passage 208b is substantially the pressure of the hydraulic fluid at the fifth port 146. Thus, the pressure of the hydraulic fluid applied to the first end 212 differs from the pressure of the hydraulic fluid applied t the second end 214 due to the fixed restriction 194.

Figure 2:
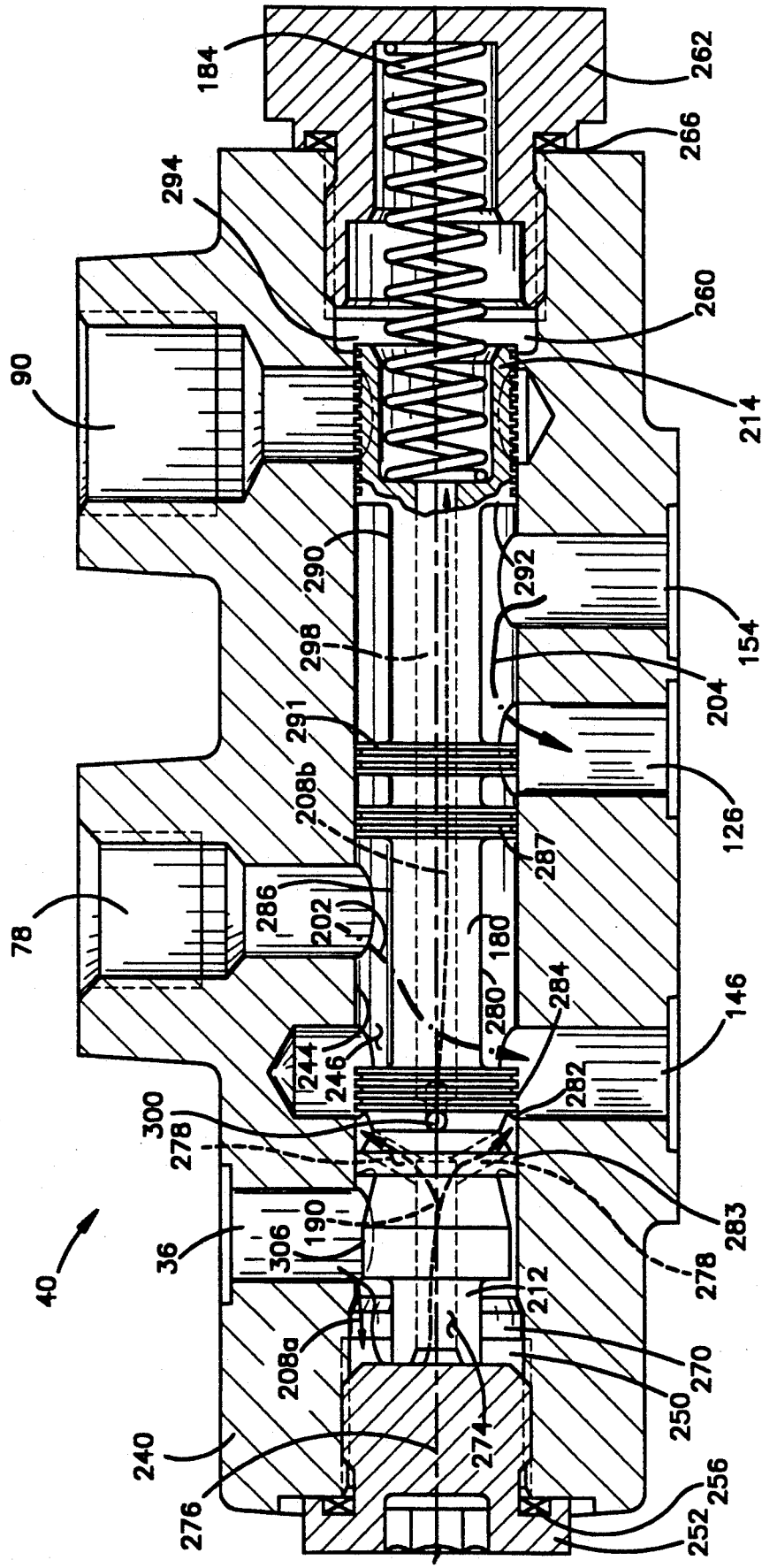
FIG. 2 is a cross-sectional illustration showing a valve which is part of the steering system of FIG. 1.
Figure 3:
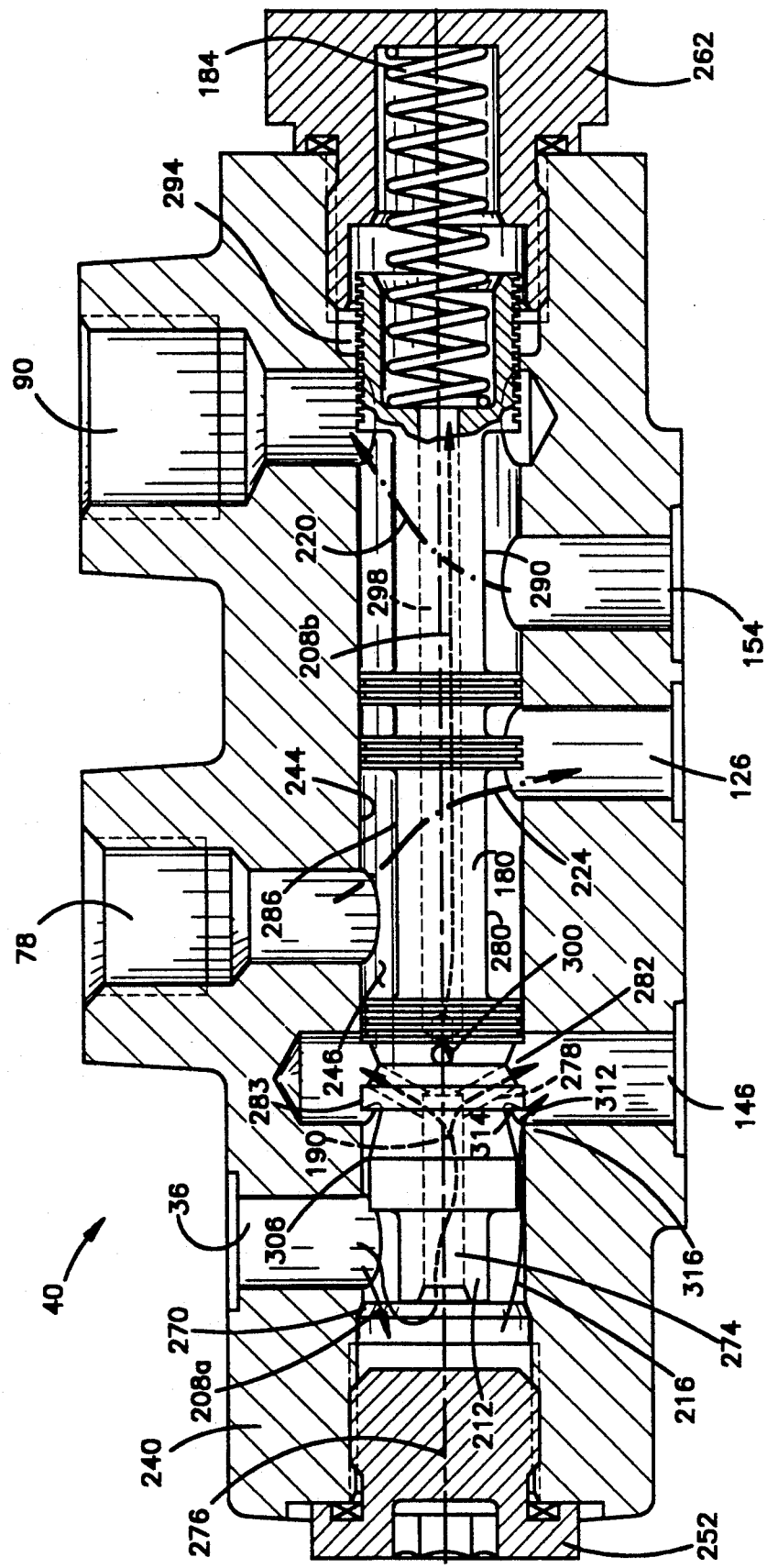
FIG. 3 is a cross-sectional illustration showing the valve of FIG. 2 with parts in a different position.

The valve member 180 is movable from the control position to a position such as shown in FIG. 3 and schematically illustrated by the left half of the valve member 180 in FIG. 1. Movement of the valve member 180 from the control position occurs when the force of the hydraulic fluid applied to the first end 212 is greater than the sum of the force of the biasing means 184 and the force of the hydraulic fluid applied to the second end 214. The movement of the valve member 180 from the control position is toward the right, in FIG. 1 and to a position such as shown in FIG. 3.

Movement of the valve member 180 to its FIG. 3 position establishes the flow passages schematically illustrated on the left half of the valve member 180 in FIG. 1. With the valve member 180 in its FIG. 3 position, the flow passage 190 is maintained and flow passage 202 and 204 are eliminated.

Also when the valve member 180 moves to its FIG. 3 position, a variable flow passage 216 is established. The flow passage 216 provides a fluid connection between the first port 36 and the fifth port 146. The flow passage 216 is in fluid parallel with the flow passage 190. Thus, the flow passages 190 and 216 each provide for flow of hydraulic fluid from the first pump 20 toward the steering valve 14.

With the valve member 180 in its FIG. 3 position, a flow passage 220 is established. The flow passage 220 provides a fluid connection between the sixth port 154 and the third port 90. Thus, hydraulic fluid returning from the steering valve 14 is directed toward the first section 30 of the reservoir 25.

With the valve member 180 in its FIG. 3 position, a flow passage 224 is also established. The flow passage 224 provides a fluid connection between the second port 78 and the fourth port 126. Thus, hydraulic fluid from the second pump 66 is directed toward the second section 31 of the reservoir 25. It should be noted that hydraulic fluid from the second pump 66 is blocked from being directed toward the steering valve 14.

The valve member 180 (FIGS. 2 and 3) is a valve spool. The control valve 40 includes a valve housing 240. In the preferred embodiment, the valve housing 240 is made of ductile iron and the valve member 180 is made of heat treated steel. A surface 244 defines a bore 246 within the housing 240. The valve member 180 is disposed within the bore 246.

The bore 246 is closed at a first end 250 by a threaded plug 252. The plug 252 includes an O-ring seal 256. The O-ring seal 256 prevents leakage of hydraulic fluid. The bore 246 is closed at a second end 260 by a threaded plug 262. The plug 262 includes an O-ring seal 266. The O-ring seal 266 prevents leakage of hydraulic fluid.

A first chamber 270 is defined within the bore 246. The first chamber 270 is defined by the surface 244, the plug 252 and the first end 212 of the valve member 180. The first chamber 270 is in fluid communication with the first pump 20 through the first port 36 and passage 208a.

An axial bore 274 extends within the valve member 180 from the first end 212. The axial bore 274 partially extends along a longitudinal axis 276 of the valve member 180. A plurality of transverse bores 278 extend from an outer periphery 280 of the valve member 180 to intersect the axial bore 274.

An annular recess 282 is formed in the outer periphery 280 of the valve member 180 at the location of the transverse bores 278. The annular recess 282 is bounded on either side by lands 283 and 284 on the valve member 180.

An annular recess 286 is defined on the outer periphery 280 of the valve member 180. The annular recess 286 is bounded on either side by lands 284 and 287 on the valve member 180. An annular recess 290 is also defined on the outer periphery 280 of the valve member 180. The annular recess 290 is bounded on either side by lands 291 and 292 on the valve member 180. Further, an annular recess 306 is defined on the outer periphery 280 of the valve member 180. The annular recess 306 extends from the first end 212 of the valve member 180 to the land 283 on the valve member 180.

A second chamber 294 is defined within the bore 246. The second chamber 294 is bounded by the surface 244, the plug 262 and the second end 214 of the valve member 180. The biasing means 184 is disposed within the second chamber 294. The biasing means 184 acts between the plug 262 and the second end 214 of the valve member 180.

An axial bore 298 extends within the valve member 180 from its second end 214. The axial bore 298 extends partially along the longitudinal axis 276 of the valve member 180. A transverse bore 300 communicates with the annular recess 282 and the axial bore 298. The transverse bore 300 extends from the annular recess 282 transverse to the longitudinal axis 276 of the valve member 180.

The flow passage 208a, communicating with chamber 270, is defined by a portion of the surface 244 adjacent the first port 36. The flow passage 208b, communicating with chamber 294, is defined by the transverse bore 300 and the axial bore 298. Thus, the first chamber 270 is substantially at the fluid pressure of the first port 36. The second chamber 294 is substantially at the fluid pressure of the fifth port 146.

When the valve member 180 is in the control position (FIG. 2), the annular recess 282 is in fluid communication with the fifth port 146. The flow passage 190 is defined by the axial bore 274, the transverse bores 278, and the annular recess 282. The fixed restriction 194 (in FIG. 1) is provided by the transverse bores 278, which have a relatively small cross-sectional flow area.

When the control valve 180 is in the control position (FIG. 2), the annular recess 286 is in fluid communication with the second port 78 and the fifth port 146. The annular recess 286 defines the flow passage 202. With the control valve member 180 in the control position, the annular recess 290 is in fluid communication with the sixth port 154 and the fourth port 126. The annular recess 290 defines the flow passage 204.

It should be noted that, when the valve member 180 is in the control position (FIG. 2), the third port 90 is not in fluid connection with any other port of the control valve 40. The third port 90 is the port of the control valve 40 connected to the first section 30 (FIG. 1) of the reservoir 25 via return line 96.

When the valve member 180 is in its FIG. 3 position, the annular recess 282 is maintained in fluid communication with the fifth port 146. Thus, the flow passage 190 is maintained. When the valve member 180 is in its FIG. 3 position, the annular recess 306 is in fluid communication with the chamber 270 and the fifth port 146. The annular recess 306 defines the flow passage 216. The flow passage 190 and the flow passage 216 each provide fluid communication between the first port 36 and the fifth port 146. Thus, the flow passages 190 and 216 are in fluid parallel.

When the valve member 180 is in its FIG. 3 position, the annular recess 290 is in fluid communication with the sixth port 154 and the third port 90. Thus, the annular recess 290 defines the flow passage 220. When the valve member 180 is in its FIG. 3 position, the annular recess 286 is in fluid communication with the second port 78 and the fourth port 126. Thus, the annular recess 286 defines the flow passage 224.

It should be noted that the valve member 180 is movable within a range of relative positions while maintaining the flow passages defined when the valve member 180 is in its FIG. 3 position. The valve member 180 is movable within the range of relative positions in response to changes in the force of the pressurized hydraulic fluid acting on the first and second ends 212 and 214 of the valve member 180.

The flow passage 216 has a variable cross-sectional flow area 312 which varies as the valve member 180 is moved within the range of relative positions. The cross-sectional flow area 312 is the area between an edge 314 on the annular land 283 and an edge 316 on the housing 240. As the valve member 180 moves to the right in response to increased force of the hydraulic fluid acting on the first end 212, the cross-sectional flow area 312 will increase. The increased cross-sectional flow area 312 will permit a greater amount of hydraulic fluid to flow through flow passage 216. Thus, the pressure differential acting across the valve member 180 due to the fixed restriction 194 (transverse bores 278) is maintained substantially constant when the valve member 180 is within the range of relative positions.

In operation, prior to the energization of engine 22 (FIG. 1) the valve member 180 is in the control position as shown in FIG. 2. Upon energization of the engine 22, the first pump 20 provides pressurized hydraulic fluid through output line 32. The pressurized hydraulic fluid from the first pump 20 flows through the first port 36 and into the first chamber 270 of the control valve 40. The pressurized hydraulic fluid flows from the first pump 20 through the flow passage 190 and the fifth port 146 toward the steering valve 14. Also pressurized hydraulic fluid from the second pump 66, if any, flows into the second port 78 via output line 76. The pressurized hydraulic fluid from the second pump 66 flows through the flow passage 202 and the fifth port 146 toward the steering valve 14. Hydraulic fluid returning from the steering valve 14 is directed to the second section 31 of the reservoir 25, via flow passage 204.

As the flow of hydraulic fluid from the first pump 20 increases, the pressure differential caused by the fixed restriction 194 (transverse bores 278) increases. The pressure in the second chamber 294 due to the fixed restriction 194. When the force of pressure of the hydraulic fluid in the first chamber 270 acting on the first end 212 is greater than the force of the biasing means 184 and the force of the pressure of the hydraulic fluid in the second chamber 294 acting on the second end 214, the valve member 180 moves toward the position of the valve member 180 shown in FIG. 3. Thus, pressurized hydraulic fluid for use by the actuator 12 is only provided by the first pump 20 via parallel flow passages 190 and 216. Hydraulic fluid returning from the steering valve 14 is directed to the first section 30 of the reservoir 25, via flow passage 220. The pressurized hydraulic fluid, if any, provided by the second pump 66 flows through the flow passage 224 and is returned to the second section 31 of the reservoir 25.

Also, if output from the first pump 20 increases, the pressure in chamber 270 will increase, and the valve member 180 will move to the right to further open the cross-sectional flow area 312 of the flow passage 216. Thus, the total resistance to hydraulic fluid flow is kept substantially constant because the flow passages 190 and 216 are in parallel.

However, if either the engine 22 or the first pump 20 becomes disabled, the flow of hydraulic fluid from the first pump 20 will decrease. As the flow of hydraulic fluid from the first pump 20 decreases, the pressure differential caused by the fixed restriction 194 (transverse bores 278) will decrease. Thus, the force applied to the first end 212 of the valve member 180 will decrease. The force applied by the biasing mean 184 and the force applied by the hydraulic fluid within the second chamber 294 moves the valve member 180 toward the control position as shown in FIG. 2.

When the pressure differential caused by the fixed restriction 194 (transverse bores 278) decreases to a predetermined level, as by disablement of the engine 22 or first pump 20, the valve member 180 returns to the control position. The pressurized hydraulic fluid from the second pump 66 flows through the flow passage 202 and the fifth port 146 and is directed to the steering valve 14. Pressurized hydraulic fluid, if any, from the first pump 20 is directed through flow passage 190, and is added to the pressurized hydraulic fluid from the second pump 66. If no pressurized hydraulic fluid is provided by the first pump 20, the one-way valve 192 prevents pressurized fluid from the second pump 66 from flowing toward the first pump 18. Hydraulic fluid returning from the steering valve 14 is directed to the second section 31 of the reservoir 25 via flow passage 204.

The present invention provides the advantage of having the movement of the valve member 180 (FIG. 1) related to the output of the first pump 20. The present invention also has a single valve member 180, which is a valve spool, which is relatively easily manufactured. Also, the present invention has flow passages 190 and 216 in fluid parallel. The flow passages 190 and 216 permit a low fluid pressure differential threshold to cause movement of the valve member 180 from its control position, and yet do not overly restrict the flow of hydraulic fluid when the first pump 20 provides a high output. Also, the pressure differential acting across the valve member 180 due to the fixed restriction 194 is maintained substantially constant because of the variable cross-sectional flow area 312 in flow passage 216.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for providing power steering assistance for a vehicle, said apparatus comprising:
   a first pump for providing pressurized fluid, said first pump being driven by an engine of the vehicle;
   a second pump for providing pressurized fluid, said second pump being driven by rotation of a ground engaging wheel of the vehicle;
   a steering valve for directing fluid toward a steering actuator means; and
   a control valve for controlling the flow of fluid from said first and second pumps to said steering valve, said passage, the first passage directing fluid from said first pump toward said steering valve, second means for providing a second variably open passage in response to fluid flow from said first pump, the second passage directing fluid from said first pump toward said steering valve, and third means for providing a third passage in response to a reduction in fluid flow from said first pump, the third passage directing fluid from said second pump toward said steering valve, the first and second passages being in fluid parallel.

2. Apparatus as set forth in claim 1, wherein said control valve includes a valve housing and a valve member, said valve member being movable relative to said valve housing, said first, second, and third means including surfaces of said valve housing and said valve member, said valve member being positioned in one range of relative positions for providing the second passage in response to fluid flow from said first pump above a predetermined magnitude, said valve member being movable relative to said valve housing from the one range of relative positions to a control position in response to fluid flow from said first pump decreasing below the predetermined magnitude, said valve member in the control position providing the third passage.

3. Apparatus as set forth in claim 2, wherein said valve member includes means defining first, second and third recesses in an outer periphery of said valve member and means defining a first bore segment within said valve member, the first recess and the first bore segment defining the first passage, the second recess defining the second passage, the third recess defining the third passage.

4. Apparatus as set forth in claim 3, wherein said means defining the second recess includes a first edge surface of said valve member, said valve housing having a second edge surface, said first and second edge surfaces defining a flow area within the second flow passage which is variable.

5. Apparatus as set forth in claim 2, further including a reservoir means for holding a supply of hydraulic fluid, said reservoir means including a barrier for dividing said reservoir means into a first section for holding hydraulic fluid for said first pump and a second section for holding hydraulic fluid for said second pump.

6. Apparatus as set forth in claim 5, wherein said valve member in the one range of relative positions defining a flow passage for directing hydraulic fluid returning from said steering valve toward the first section of said reservoir, said valve member in the control position defining a flow passage for directing hydraulic fluid returning from said steering valve toward the second section of said reservoir.

7. Apparatus as set forth in claim 1, wherein said valve housing includes means defining a bore, said valve member being movably disposed within said bore, said valve housing and a first end of said valve member partially defining a first chamber within the bore for receiving fluid from the first pump means, said valve housing and a second end of said valve member partially defining a second chamber within the bore for receiving fluid from the first pump means, said valve member having means defining a fourth flow passage for communicating fluid from the firs pump to the second chamber.

8. A valve as set forth in claim 7, wherein said means defining said fourth flow passage includes means defining first and second bore segments within said valve member.

9. Apparatus for controlling a flow of hydraulic fluid from first and second hydraulic pump means toward a hydraulic fluid utilization means, said apparatus comprising:
a valve housing;
a valve member movable relative to said valve housing in response to a pressure differential in the fluid from said first pump means acting across said valve member;
said valve member in one range of relative positions having means defining a first flow passage for directing fluid from the first pump means toward the fluid utilization means and means for blocking fluid flow from the second pump means toward the fluid utilization means;

said valve member in the one range of relative positions also having means defining a second flow passage for directing fluid from the first pump means toward the fluid utilization means, the first and second flow passages being in fluid parallel and said second flow passage being variable in flow area as said valve member moves relative to said housing; and
said valve member being movable relative to said valve housing from the one range of relative positions to a control position in response to the pressure differential decreasing to a predetermined magnitude, said valve member in the control position having means defining a third flow passage for directing fluid from the second pump means toward the fluid utilization means.

10. Apparatus as set forth in claim 9, wherein said valve housing and said valve member in the control position have means for blocking fluid flow through the second flow passage.

11. Apparatus as set forth in claim 9, wherein said means defining the first flow passage includes means defining a first recess in the outer periphery of said valve member and means defining a bore segment within said valve member, said means defining the second flow passage includes means defining a second recess in the outer periphery of said valve member, and said means defining the third flow passage includes means defining a third recess in the outer periphery of said valve member.

12. Apparatus as set forth in claim 11, wherein said means defining the second recess includes a first edge surface of said valve member, said valve housing having a second edge surface, said first and second edge surfaces defining a flow area within the second flow passage which is variable.

13. Apparatus as set forth in claim 9, said valve housing including means defining a bore, said valve member being movably disposed within said bore, said valve housing and a first end of said valve member partially defining a first chamber within the bore for receiving hydraulic fluid from the first pump means, said housing and a second end of said valve member partially defining a second chamber within the bore for receiving hydraulic fluid from the first pump means, said valve member having means defining a fourth flow passage for communicating fluid from the first pump to the second chamber.

14. A valve as set forth in claim 13, wherein said means defining a fourth flow passage includes means defining a bore segment within said valve member.

15. Apparatus as set forth in claim 14, wherein said valve member includes means defining first, second and third recesses in the outer periphery of said valve member and means defining a second bore segment within said valve member, said first recess and said second bore segment partially defining the first flow passage, said second recess partially defining the second flow passage, said third recess partially defining the third flow passage.

16. A valve as set forth in claim 15, further including a spring for biasing said valve member toward the control position, said spring being disposed within the second chamber and being engaged with said second end of said valve member.

* * * * *